April 22, 1969     E. LAIMINS     3,439,761

STRAIN-GAGE TRANSDUCER STRUCTURES

Filed Oct. 17, 1966     Sheet _1_ of 2

INVENTOR.
ERIC LAIMINS
BY
Thomson & Mrose
ATTORNEYS

April 22, 1969 E. LAIMINS 3,439,761
STRAIN-GAGE TRANSDUCER STRUCTURES
Filed Oct. 17, 1966 Sheet 2 of 2
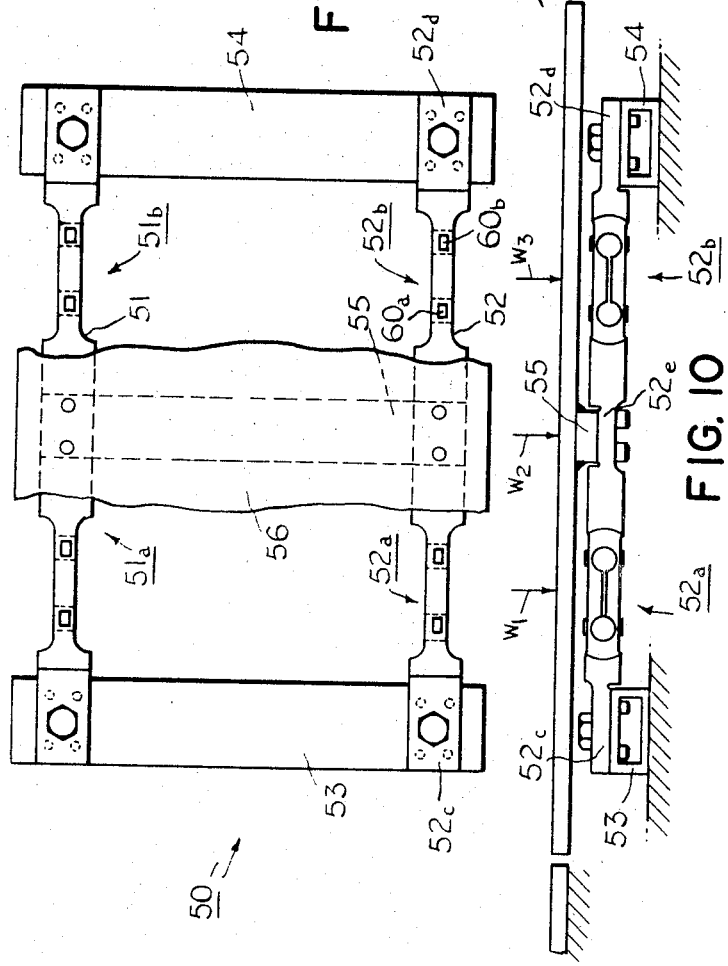
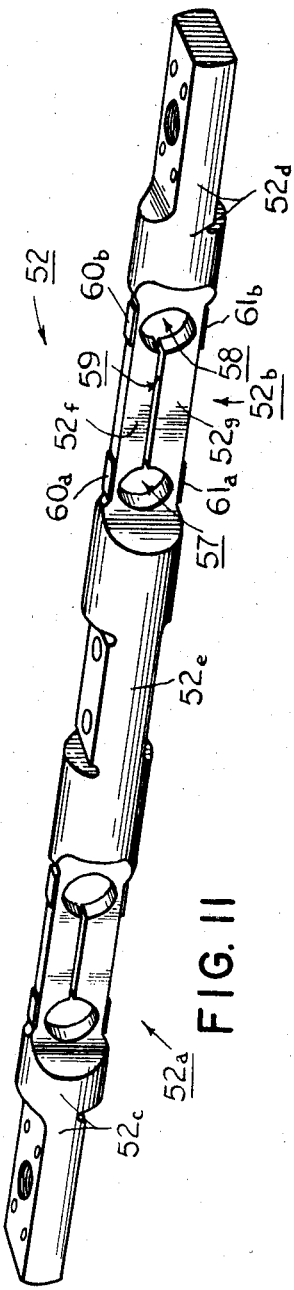
INVENTOR.
ERIC LAIMINS
BY
Thomson & Mrose
ATTORNEYS United States Patent Office 3,439,761
Patented Apr. 22, 1969

3,439,761
STRAIN-GAGE TRANSDUCER STRUCTURES
Eric Laimins, Belmont, Mass., assignor to BLH Electronics, Inc., Waltham, Mass., a corporation of Delaware
Filed Oct. 17, 1966, Ser. No. 587,047
Int. Cl. G01g 3/14
U.S. Cl. 177—211                          12 Claims

ABSTRACT OF THE DISCLOSURE

A rigid load-carrying structure, such as a scale platform, is mounted in relation to a support solely by parallel beam elements having their adjacent ends interconnected to constrain movements of the load-carrying structure to one path, and having electrical strain gages applied to the elements and connected to characterize only the loading along the one path of movements.

---

The present invention relates to improvements in the precision measurement of forces by way of gaged parallel-connected structural elements, and, in one particular aspect, to novel and improved electrical strain-gage apparatus of inexpensive compact construction wherein mechanically paralleled structural members are gaged to function as accurate force sensors in a unique cooperative array which develops electrical output signals highly isolated from unwanted information and from disturbances attributable to variations in the locations of loading forces.

It has long been well known to measure elastic strains resulting from loading-induced stresses of elements such as beams, columns, diaphragms, and the like, using electrical strain gages for the accurate translations of the exhibited strains into convenient related variations in electrical impedances. Wire, foil and semiconductor type gages find widespread application in such transducer devices and well lend themselves to manufacture in highly miniaturized forms suitable for installation upon small surface areas of such sensing elements. Commonly, the transducers are designed and fabricated as self-contained devices intended to satisfy the needs of a variety of installations, and, in general, they tend to be accurately responsive only when the applied loading is carefully centered with a predetermined axis. In small-size units, auxiliary diaphragms are often employed to suppress undesirable lateral deflections, and, in larger assemblies such as those of massive weighing platforms or the like, potentially troublesome side forces may be resisted by strong but somewhat elastic structural members sometimes termed flexures or stay rods; both arrangements effectively parallel the load cells or transducers with the flexible guide provisions. For the latter reason, the critical spring characteristics of the sensor are modified by those of the paralleled flexure members, and measurement accuracy and linearity can thus be seriously impaired by any erratic or nonlinear behavior of these members. In accordance with certain aspects of the present teachings, however, measurement transducers of a special parallelogram type are themselves caused to provide mechanical support and stability in connection with the handling and evaluation of either massive or relatively small loads, such that the sole spring or flexure characteristics effective during measurements are those of the transducers, and such that needs for auxiliary guides and supports are obviated. Each transducer is formed by two relatively stiff elastic beams secured in superposed parallel relationship generally transversely to the direction of expected loading, the end connections for the beams being rigid and secured inflexibly to a stationary support and to a relatively movable load-carrying structure, respectively. The transducer construction and mounting restrict the load-carrying structure to highly advantageous substantially linear motion, and measured strains exhibited at selected surfaces are uniquely found to characterize essentially pure shear when other effects are offset by unique bridge-circuit balancing. Loads which dynamically undergo lateral movements, or are not centered, or which involve collateral forces imposed by conveyor belts or the like, are nevertheless accurately measured by the associated strain-gage circuitry.

Accordingly, it is one of the objects of the present invention to provide novel and improved structural transducer apparatus for efficient and advantageous support and measurement of loads.

Another object is to provide high-precision electrical strain gage transducers which respond essentially to forces in one direction, with negligible error due to locations of such forces within a large area and with substantial immunity to effects of lateral motions of a load or load conveyor.

Further, it is an object to provide improved force transducers of low-cost parallel-beam constructions wherein rigid end connections and unique mountings of parallel elastic beams induce force-responsive surface strains which, in combination, characterize magnitudes of applied forces substantially independently of their positions.

Still further, it is an object of this invention to provide novel and advantageous low-height and compact parallelogram-type structures which serve both to support and measure loads and which deflect substantially linearly.

It is yet another object to provide improved platform scales, including scales designed for integration into load-conveying systems, wherein unique parallelogram-type supports mount the loading platform for substantially linear deflection and produce precise strain gage bridge-circuit measurements of loads undergoing motion or occupying any platform position.

By way of a summary account of practice of this invention in one of its aspects, a scale platform underlying a horizontal load-conveying belt is centrally mounted in relation to a stationary foundation by a double spaced pair of cantilever units. Each of the cantilever units comprises two parallel horizontal beam elements, one above the other, which are of proportions and material allowing for certain deformations under loading and which have their vertically spaced ends integrally secured with relatively rigid and nondeformable end portions, thereby forming a perpendicularly sided (right) open parallelogram structure in which only the two horizontal opposite sides are slightly deformable. Two of such cantilever units are connected end-to-end, integrally at horizontally spaced positions, with their junctures secured rigidly to the underside of the platform and with their outer ends secured rigidly to the stationary foundation. Electrical-resistance strain gages are applied to selected surfaces of at least one of the cantilever units, typically one along the outside and near each end of the horizontal beam elements, and these gages are cross-connected in a bridge circuit which effects nulling of unwanted responses to surface strains of the same sense along each of the two beam elements. Each of the gaged cantilever units thus operates in the manner of a pure shear sensor, thereby remaining insensitive to specific load positions or to lateral drag-loading forces imposed by the conveyor belt, and, in addition, the platform is stably suspended for deflections vertically without freedom for lateral motion.

Although the features of this invention which are considered to be novel are expressed in the appended claims, further details as to preferred practices and as to the further objects and features thereof may be most readily comprehended through reference to the following description taken in connection with the accompanying drawings, wherein:

FIGURE 1 portrays in perspective an improved platform-scale portion of a conveyor-type load-carrying system;

FIGURE 2 provides a side view of an arrangement such as that of FIGURE 1, together with load designations;

FIGURE 3 illustrates a rigid-ended parallelogram-type double cantilever structure transducer and its deformations under loading;

FIGURE 4 presents bridge circuit connnections which yield shear-related outputs from strain gages associated with the transducer of FIGURE 3;

FIGURE 5 portrays an improved gaged double-cantilever suspension for a tank-type load;

FIGURE 9 provides a plan view, with portions broken away, of an improved platform-type weighing scale arrangement utilizing a double pair of gaged structural transducers;

FIGURE 10 illustrates the scale arrangement of FIGURE 9 from the side; and

FIGURE 11 is a view of an end-to-end connected structural transducer of the scale represented in FIGURES 9 and 10.

Figure 1:
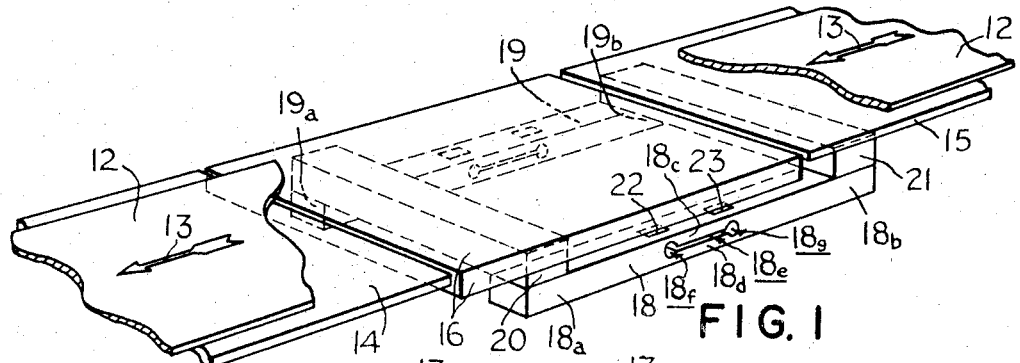
Figures 2, 3, 4:
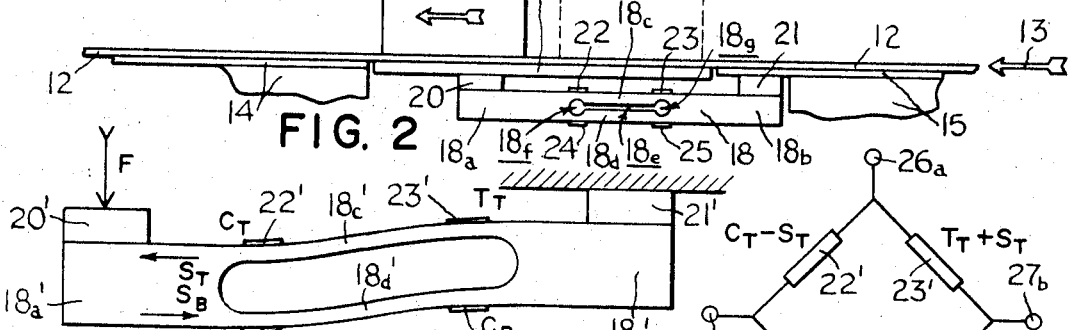

The load-weighing equipment depicted in FIGURES 1 and 2 includes a somewhat flexible conveyor belt 12 movable substantially horizontally in the direction of arrows 13 under powering from appropriate motive means (not illustrated) and supported atop fixed platform members 14 and 15 and an intermediate rigid scale platform 16 which has a limited freedom for vertical deflection under loading of transported weights such as the bulk item 17 shown in FIGURE 2. Scale platform 16 is mounted in relation to a stationary foundation by way of a double-cantilever arrangement including two special parallelogram-beam cantilevered elements 18 and 19 each having one stiff end, $18_a$ and $19_a$, rigidly and securely affixed to that platform by way of a cross-beam 20 and having an opposite stiff end, $18_b$ and $19_b$, rigidly and securely affixed to the foundation by way of a cross-beam 21 associated with the stationary foundation-supported platform member 15. Relatively narrow elements 18 and 19 are disposed in a spaced substantially parallel alignment which imparts sound lateral stability to the platform 16 without need for auxiliary stays, and both elements are substantially identical. The parallelogram construction shown for beam element 18 is typical and includes a pair of relatively deformable parallel elastic intermediate portions $18_c$ and $18_d$ which are substantially horizontal and disposed between the relatively rigid integral end portions $18_a$ and $18_b$; conveniently these deformable portions are fabricated by machining a slot $18_e$ between two spaced transversely drilled holes $18_f$ and $18_g$ which are of large enough diameter to thin out the beams and promote good flexure characteristics at the top and bottom positions. Electrical-resistance strain gages 22 and 23 along top surfaces at the flexure sites, and gages 24 and 25 along bottom surfaces at the flexure sites, respond to surface strains of the resulting parallelogram-type beam, and may be interconnected in a bridge relationship (discussed later herein) which renders the measurement outputs insensitive to load positioning. As is shown in FIGURE 2, for example, the load 17 need not be centered, and the same load at the dashed-line position 17 will yield the same weight measurement. Minute deflections of the scale platform 16 and elements 18 and 19 occur under loading, but are essentially vertical, and the compliant conveyor belt accommodates such deflections; importantly, however, collateral horizontal forces such as the associated frictional drag forces of the conveyor belt do not evidence themselves in the measurement output.

The parallelogram-beam element illustrated in FIGURE 3, characterizes the operation of beams such as the element 18 in FIGURES 1 and 2, and corresponding features are, for convenience, designated by the same reference characters with distinguishing single-prime accents added. Deformable parallel intermediate portions $18_c'$ and $18_d'$ tend to respond to a vertical loading F by elastically deforming in the manner shown (FIGURE 3), with the rigid end portions $18_a'$ and $18_b'$ remaining substantially parallel and with the free end descending substantially vertically. My prior U.S. Patent No. 2,866,059 discloses a load-cell single-unit sensing element having certain characteristics in common with the combined structural transducers of the present invention. Under the load-induced bending deflection conditions illustrated in FIGURE 3, both parallelogram-type beam units (18 and 19) will exhibit unique surface strains; taking unit 8 as the example, gages 22' and 23' along the top surface of the top element $18_c'$, will experience compression $C_T$ and tension $T_T$, respectively, while the gages 24' and 25' along the bottom surface of the bottom element $18_d$, will experience tension $T_B$ and compression $C_B$, respectively. In addition, certain membrane or fiber stress effects can be witnessed by the beam units and their gages; however, these are of one sense, in tension $S_T$, along the entire top gaged surface, and of the opposite sense, in compression $S_B$, along the entire bottom gaged surface, and are of substantially the same magnitude for the like-proportioned beam elements. Accordingly, the bridge-circuit interconnection of these gages, as represented in FIGURE 4, will yield outputs related only to the applied force F. Similarly, strains resulting from conveyor-belt drag or the like will be wholly in one direction, and of the same magnitudes at the top and bottom, such that the bridge balance is not disturbed. Either of the pairs of bridge terminals $26_a$–$26_b$, and $27_a$–$27_b$ may serve as the electrical input terminals while the other delivers output to a conventional end device such as a direct-indicating or recording device. The gaging on companion beam unit 19 may be similarly arrayed in bridge circuitry, or the active gaging may be in part on one of the beam units and in part on the other. Preferably, both of the beam units are similarly gaged, and their outputs are both connected to the end device, such that any differences in lateral positionings of the loads will not affect the measurements. The two parallel beam units 18 and 19 are preferably spaced as widely as the scale platform dimensions will conveniently permit, thereby producing a stable support for the platform in the lateral directions, and thereby insuring that laterally uncentered loads will be well shared by the two beam units. In an alternative arrangement, the two laterally-spaced beam units may be secured to the foundation by way of the two different platform sections 14 and 15, rather than one. Rollers, bearing balls, or the like, may be used on the scale platform and its associated stationary platforms, in lieu of the illustrated conveyor belt, with similar advantages being realized. Half-bridge circuitry may be used, also.

Figures 5, 6:
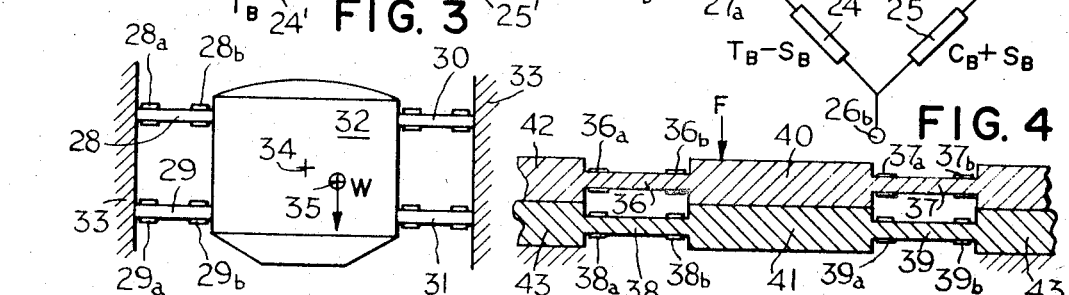
FIGURE 6 is a cross-section of end-to-end connected beam-type structural elements gaged for responses which suppress errors due to eccentric loadings.

The structural transducers may, for other applications, be formed by pairs of parallel common structural beams, such as the pairs of beams 28–29 and 30–31 which support the tank of bin load 32 in FIGURE 5. There each of the beams is rigidly connected at its outer end with a fixed support 33, and, at its inner end, with the load 32. Although two pairs of fixed-fixed beams appear in the drawing, one or more further pairs may also be used to enhance stability of support. These beam units guide the load for small deflections vertically, and the surface strains exhibited near their ends are of the character discussed in connection with the illustration in FIGURE 2. Importantly, shifts in the center of gravity of the load from a central position 34 to some eccentric location, such as that designated at position 35 for the total weight W, do not disturb the precise measurements effected by the associated strain gages, and, the load measurements are achieved directly and with high sensitivity by transducers which themselves serve as the sole structural supports and are not shunted by accessory support members whose deflection characteristics could destroy measurement accuracies. Considering one of the appropriate gaging practices, the gages $28_a$ and $28_b$ atop beam element 28 may be cross-connected in bridge-circuit relationship with gages $29_a$ and $29_b$ of beam element 29, for example, or the unnumbered gages opposite them may instead be so connected; the combined measurement outputs from gaging of all the beam units provide optimum data as to the load weight, however distributed. For some purposes, such as the hanging and measuring of piping, only one pair of the gaged beam elements (such as 28–29) need be used at each hanging position, the desired parallelogram array being fashioned either from one integral member or from separate beams rigidly secured at their ends to the support and to the piping or a member fixed with the piping. In connection with such pipe suspensions, the parallel beam structural transducer elements are disposed horizontally one above the other for weight measurements, and, for measurements of expansion and contraction, are disposed in parallel alignment with the pipe axis. The electrical output signals may then be used in known ways to measure weight and/or expansion and to provide indications or compensating control.

Figure 7:
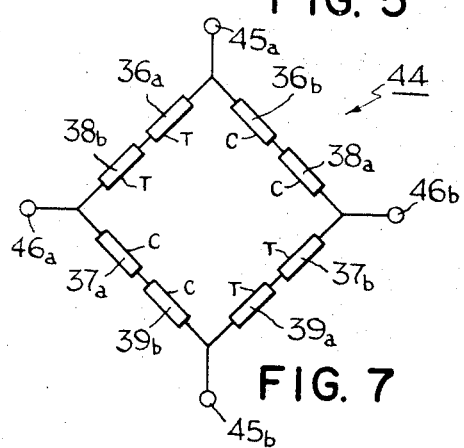
FIGURE 7 shows bridge-circuit interconnections for the strain gages in FIGURE 6.
Figure 8:
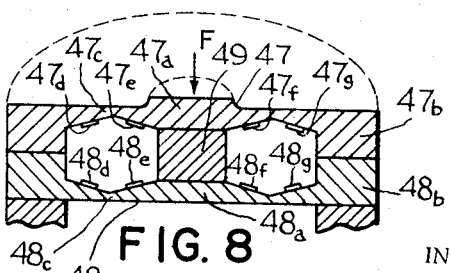
FIGURE 8 is a cross-sectional illustration of an internally gaged force-responsive double-cantilever construction, together with dashed linework characterizing the embodiment in a circular configuration.

The arrangement in FIGURE 6 is one wherein like end-to-end connected deformable beam elements 36–37 and 38–39 are advantageously formed integrally with their respective central rigid load-receiving portions 40 and 41 and their respective outer rigid support portions 42 and 43. The outer and central portions of the two sections are secured together to form a unit which will withstand and accurately measure applied forces, F, even though they are not centered or evenly distributed. As is shown in FIGURE 7, the top-surface strain gages $36_a$–$36_b$ and $37_a$–$37_b$ may be interconnected in one bridge array, 44, with the bottom-surface gages $38_a$–$38_b$ and $39_a$–$39_b$ to provide precise force-related measurement output signals at one of the terminal sets $45_a$–$45_b$ and $46_a$–$46_b$ when the other is electrically excited from a suitable electrical power source. Gages $36_a$ and $38_b$ in one bridge arm, and gages $37_b$ and $39_a$ in the opposite arm, experience tension T when force is applied in the direction of F in FIGURE 6, while, simultaneously, the gages $36_b$ and $38_a$ in a third arm and gages $37_a$ and $39_b$ in the opposite arm experience compression C. Alternatively, or in addition, the unnumbered gages shown in FIGURE 6 may be employed to produce like or additional useful outputs. Elements 36–37 and 38–39, respectively, may be integral portions of continuous annular structural members, in the nature of diaphragms, and may have cross-sections which are non-uniform. FIGURE 8 characterizes such a construction; there, the back-to-back joined elements 47 and 48 have enlarged rigid central or hub portions $47_a$ and $48_a$ interconnected by an internal member 49, the rigid outer rim portions $47_b$ and $48_b$, respectively. The intervening relatively deformable portions $47_c$ and $48_c$ which are preferably of generally circular outline, are thinner at about their midpositions, and have generally radially-extending strain gages, $47_d$–$47_g$ and $48_d$–$48_g$ affixed to their inner surfaces where they are disposed for protective sealed enclosure by the elements themselves. Inner upper and lower outer gages ($47_e$, $47_f$, $48_d$ and $48_g$) respond to tension T effects while the outer upper and lower inner gages ($47_d$, $47_g$, $48_e$ and $48_f$) respond to compression C effects produced by the loading F, which need not be centered for precise measurements to be realized when the gages are interconnected in a bridge relationship as taught hereinabove. Additional radially-arrayed gages may also be used. Fluid pressure measurements, including those of differential pressures, may be performed by this type of device; significantly, accessory diaphragms and their error-inducing and nonlinear characteristics are entirely avoided and construction is of course remarkably simple.

Platform scale 50, in FIGURES 9 and 10, is of a construction which advantageously employs two laterally spaced elongated parallel structural transducers, 51 and 52, each including integral end-to-end connected portions, $51_a$–$51_b$ and $52_a$–$52_b$, respectively. As is shown in the FIGURE 11 view of one of these like transducers, 52, they are conveniently fabricated of cylindrical metallic bar stock, the outer ends $52_c$ and $52_d$ being rigid, although machined flat for secure mounting atop foundation-supported box beam members 53 and 54, respectively. Rigid central portion $52_e$ is likewise machined flat for solid interconnection with a member 55 secured with the underside of a stiff weighing platform 56, as by welding. Each transducer portion is caused to exhibit the desired parallelogram-type beam characteristics by having an intermediate section of reduced cross-section drilled and slotted transversely, as in the case of the spaced drilled holes 57 and 58 and interconnecting slot 59 of portion $52_b$ (FIGURE 11). Strain gages $60_a$–$60_b$ and $61_a$–$61_b$ longitudinally spaced along the top and bottom surfaces, respectively, of the resulting upper and lower beam elements $52_f$ and $52_g$, are interconnected to respond only to the magnitude of the total weight $W1+W2+W3$ (FIGURE 10), carried by the platform 56, irrespective of weight location and distribution. The other portions are similarly gaged. Motion of platform 56 is limited to small vertical deflections, the suspension otherwise being substantially rigid. Deflections are strictly a function of the reduced cross-sectional area, the distance between rigid mountings for the beam portion, and magnitude of the applied vertical force, for the like beam portions, and the measurements are effectively those of the existing pure shear. Horizontal forces are not sensed. The structural transducers are advantageously of exceptionally low height, and, in other arrangements, may be disposed at corner locations at right angles to one another, or in a radial array, and so forth. Although electrical-resistance type strain gages have been specifically illustrated and discussed, their functions may instead be discharged by gages operating differently, as, for example, magnetic induction type gages of known cross-coil types which are threaded through a strained magnetic-material member and which, for present purposes, may comprise a third deformable beam member parallel with and disposed between the upper and lower beam elements of the parallelogram structure.

What I claim as new and desire to secure by Letters Patent of the United States is:

1. Force measuring apparatus comprising a relatively fixed support, a load-carrying structure, and at least two structural transducer means providing substantially the sole mechanical mounting for said load-carrying structure in relation to said support, said structural transducer means comprising a pair of spaced substantially parallel beam elements of material having high elasticity, means rigidly interconnecting two adjacent ends of said beam elements together and to said load-carrying structure, means rigidly interconnecting the opposite adjacent ends of said beam elements of each of said structural transducer means together and connecting said opposite ends of said beam elements of each of said structural transducer means to said support at a different position, whereby mechanical stability of said load-carrying structure in relation to said support is enhanced, and electrical strain gage means responsive only to stresses characterizing the magnitude of forces applied to said structural transducer means by said load-carrying structure in direction perpendicular to said beam elements in substantially the same plane therewith, said structural transducer means limiting deflections of said load-carrying structure relative to said support to substantially said direction.

2. Force measuring apparatus as set forth in claim 1 wherein two of said structural transducer means are connected in a substantially end-to-end relationship, said spaced parallel beam elements of one of said structural transducer means being substantially collinear with the beam elements of another of said structural transducer means.

3. Force measuring apparatus as set forth in claim 1 wherein said load-carrying structure comprises a substantially rigid weighing platform, wherein said interconnecting means connects said opposite ends of said beam elements of two of said structural transducer means to said support at horizontally spaced positions with the two beam elements of each of said structural transducer means extending substantially horizontal one above the other and substantially parallel with the corresponding beam elements of the other of said structural transducers, and wherein said means connecting the ends of said beam elements to said force-responsive means mounts said platform substantially horizontally above said structural transducer means.

4. Force measuring apparatus as set forth in claim 2 wherein said beam elements of the two end-to-end structural transducer means are of substantially the same length and cross-sectional configurations, and wherein the adjacent ends of the beam elements of each structural transducer which are connected together and to said load-carrying structure are also rigidly interconnected with one another.

5. Force measuring apparatus as set forth in claim 2 wherein said load-carrying structure comprises a substantially rigid weighing platform, wherein said two structural transducer means in end-to-end relationship comprise an integral elongated structural member having openings through the two halves thereof separating at least part of each of the two halves into substantially identical upper and lower beam elements, and further comprising a second two structural transducer means substantially identical with and in substantially parallel spaced horizontal relationship with said first-named two structural transducer means, and means rigidly securing the rigid central portions of said elongated members, between the said halves thereof, to said weighing platform at horizontally spaced positions and thereby securely mounting said platform substantially horizontally for limited vertical deflections in relation to said support.

6. Force measuring apparatus as set forth in claim 3 further comprising conveyor means for transporting articles substantially horizontally across said platform and simultaneously transmitting the weights of the articles to said platform.

7. Force measuring apparatus as set forth in claim 6 wherein said conveyor means includes a flexible conveyor belt atop and in contact with said platform and movable thereacross in direction substantially parallel with said beam elements of said structural transducer means.

8. Force measuring apparatus comprising a relatively fixed support, a load-carrying structure, and at least one structural transducer means providing substantially the sole mechanical mounting for said load-carrying structure in relation to said support, said structural transducer means comprising a pair of spaced substantially parallel beam elements of substantially annular configuration and of material having high elasticity, means rigidly interconnecting the opposite adjacent ends of said beam elements together and to said load-carrying structure, said adjacent ends of said beam elements connected to said load-carrying structure being inner peripheral edges of the annular elements, means rigidly interconnecting the opposite adjacent ends of said beam elements together and to said support, and electrical strain gage means responsive only to stresses characterizing the magnitudes of forces applied to said structural transducer means by said load-carrying structure in direction perpendicular to said beam elements in substantially the same plane therewith, said structural transducer means limiting deflections of said load-carrying structure relative to said support to substantially said direction.

9. Force measuring apparatus as set forth in claim 8 wherein said gage means comprises at least two electrical resistance strain gages each connected to a surface of said annular elements which faces the other of said annular elements and each of which gages is disposed substantially radially near a different peripheral edge of said annuler elements and responds to substantially radial surface strains, and means connecting said strain gages in a bridge circuit relationship which balances effects of stresses of the same sense in each of said annular elements.

10. Force measuring apparatus as set forth in claim 9 wherein the means rigidly interconnecting the outer peripheral edges of said annular beam elements provides a tight seal therebetween, and wherein said annular beam elements and the means connecting the inner edges thereof with one another provide a tight seal with said outer edges, in enclosing relationship to said gages.

11. Force measuring apparatus comprising a substantially rigid weighing platform, relatively fixed support means, and a plurality of structural transducer units providing the sole mechanical mounting for said platform in relation to said support means, each of said structural transducer units being like the others and comprising a pair of like substantially horizontal parallel beam elements of highly elastic material having their adjacent ends joined one above the other by substantially rigid interconnections, means securing one of said interconnections of each of said units to said support means, means rigidly securing the other of said interconnections of each of said units to said platform with said platform disposed substantially horizontally above said structural transducer units, and four electrical resistance strain gages associated with each of said structural transducer units, the gages in each of said units each being secured to a surface of said beam elements near a different one of said ends thereof and disposed to respond to surface stresses in direction along said beam elements, and means connecting said strain gages in a bridge circuit relationship which balances effects of stresses of the same sense in each of said beam elements.

12. Force measuring apparatus as set forth in claim 11 wherein pairs of said structural transducer units are integral with one another in an end-to-end relationship wherein the like beam elements thereof are substantially collinear, means mounting at least two of said pairs of integral structural transducer units in a substantailly horizontal parallel spaced relationship on said support means, and means mounting said platform on said spaced pairs of integral structural transducer units at horizontally spaced positions.

References Cited

UNITED STATES PATENTS

| 2,597,751 | 5/1952 | Ruge | 177—211 X |
| 3,124,770 | 3/1964 | Ciavatta | 177—211 X |
| 3,136,157 | 6/1964 | Seed et al. | 177—211 X |

FOREIGN PATENTS

| 117,851 | 2/1958 | U.S.S.R. |

RICHARD B. WILKINSON, *Primary Examiner.*

G. H. MILLER, JR., *Assistant Examiner.*

U.S. Cl. X.R.

177—16